UNITED STATES PATENT OFFICE.

LOUIS SHOENFELD, OF EUFAULA, ALABAMA.

IMPROVEMENT IN CONDITION-POWDERS FOR HORSES AND CATTLE.

Specification forming part of Letters Patent No. 194,379, dated August 21, 1877; application filed May 16, 1877.

*To all whom it may concern:*

Be it known that I, LOUIS SHOENFELD, of Eufaula, in the county of Barbour and State of Alabama, have invented certain new and useful Improvements in Medicated Feed for Horses, Cattle, &c.; and I do hereby declare that the following is a full, clear, and exact description thereof, which will enable others skilled in the art to which it appertains to make and use the same.

To prepare this compound, I take of corn-meal two hundred and twenty-five pounds, of St. John's bread (locust-beans) one hundred and fifty pounds, and of French hemp-seed one hundred and six pounds. These ingredients are ground up into a coarse powder and thoroughly mixed. I then add the following ingredients in about the proportions stated, to wit: juniper-berries, thirty-seven and one-half pounds; flaxseed, eighteen pounds; sugar, fourteen and one-half pounds; salt, nine and one-half pounds; saltpeter, five and one-half pounds; fenugreek-seed, five and one-half pounds; coriander-seed, two and one-half pounds; anise-seed, one and one-quarter pound; turmeric, two and one-half pounds; ginger, one and one-half pound; bloodroot, one and one-half pound; cream-tartar, three-fourths of a pound; grains of paradise, (Malegueta pepper,) one and three-quarters pound; sulphur, two and one-half pounds; bicarbonate of soda, one and three-quarters of a pound; Peruvian bark, one and one-fourth pound; gentian, two and one-half pounds, and levigated antimony, one and three-quarters of a pound.

Such of these ingredients as are not in their nature seed or powder are first ground into a coarse powder and then added to the rest, after which the whole mass is thoroughly mixed, and the compound is ready for use.

I have found this compound to be an excellent addition to the feed of horses and cattle, keeping them in good condition, and preventing disease. When mixed with the feed of hogs, poultry, and other small animals, it will prevent cholera and other sickness. The quantity to be used depends somewhat on circumstances, but as a rule, one pint, by measure, of the compound, mixed with every feed for horses and cattle, will suffice; and for foals, sheep, pigs, &c., one-half of that quantity given with each feed is generally enough.

I am aware that some of the ingredients herein named have been used before in condition-powders and similar compounds; hence I do not claim the use of any one of them either separately or in combination with other ingredients; but

Having thus described my invention, I claim and desire to secure by Letters Patent of the United States—

A medicated compound for the cure of, and prevention of, disease among horses, cattle, and other animals, consisting of juniper-berries, flaxseed, sugar, salt, saltpeter, fenugreek-seed, coriander-seed, turmeric, ginger, bloodroot, cream-tartar, grains of paradise, sulphur, bicarbonate of soda, Peruvian bark, gentian, and levigated antimony, in or about the proportions specified.

In testimony that I claim the foregoing as my own I have hereto affixed my signature in presence of two witnesses.

LOUIS SHOENFELD.

Witnesses:
 ABRAHAM BERINGER,
 J. H. WHITLOCK.